(12) United States Patent
Trester et al.

(10) Patent No.: US 10,165,037 B2
(45) Date of Patent: *Dec. 25, 2018

(54) METHOD AND APPARATUS FOR DETERMINING BANDWIDTH REQUIRED FOR A PAGE FEATURE

(71) Applicant: CBS INTERACTIVE INC., San Francisco, CA (US)

(72) Inventors: Jason Trester, Louisville, KY (US); John Landgrave, Louisville, KY (US)

(73) Assignee: CBS INTERACTIVE INC., San Francisco, CA (US)

( * ) Notice: Subject to any disclaimer, the term of this patent is extended or adjusted under 35 U.S.C. 154(b) by 174 days.

This patent is subject to a terminal disclaimer.

(21) Appl. No.: 14/718,015

(22) Filed: May 20, 2015

(65) Prior Publication Data

US 2016/0344603 A1 Nov. 24, 2016

(51) Int. Cl.
*H04L 29/08* (2006.01)
*G06F 17/30* (2006.01)

(52) U.S. Cl.
CPC ........ *H04L 67/02* (2013.01); *G06F 17/30902* (2013.01); *H04L 67/2828* (2013.01)

(58) Field of Classification Search
None
See application file for complete search history.

(56) References Cited

U.S. PATENT DOCUMENTS

| | | | | |
|---|---|---|---|---|
| 6,963,874 B2* | 11/2005 | Kasriel | ............... | G06F 17/3089 702/180 |
| 6,973,490 B1* | 12/2005 | Robertson | ............. | H04L 41/022 709/202 |
| 8,065,410 B1 | 11/2011 | Breen et al. | | |
| 8,286,176 B1 | 10/2012 | Baumback et al. | | |
| 9,037,638 B1 | 5/2015 | Lepeska et al. | | |
| 9,477,644 B1* | 10/2016 | Oertel | ................. | G06F 17/3089 |
| 2002/0188717 A1* | 12/2002 | Mushlin | ............. | G06F 11/3447 709/224 |
| 2003/0217144 A1* | 11/2003 | Fu | ........................... | H04L 29/06 709/224 |
| 2005/0257400 A1* | 11/2005 | Sommerer | ........ | G06F 17/30873 36/13 |

(Continued)

OTHER PUBLICATIONS

WebPagetest—Website Performance and Optimization Test—webpagetest.org accessed on Feb. 17, 2016.

(Continued)

*Primary Examiner* — Shirley X Zhang
(74) *Attorney, Agent, or Firm* — Rimon, P.C.; Marc S. Kaufman (57) ABSTRACT

A computer implemented method, a computer system, and computer code stored on tangible, non-transient media, for determining bandwidth of a page load for a specific feature associated with the page. Network traffic associated with requests of a loading of a page to be displayed on a device is monitored. Requests of the loaded page are assigned to an associated function of the page. At least one request chain associated with the associated function is created and a respective time for loading of each of the at least one request chains is determined. An aggregate of the respective times for loading is used to determine a bandwidth metric associated with the feature.

20 Claims, 7 Drawing Sheets

(56) References Cited

U.S. PATENT DOCUMENTS

| | | |
|---|---|---|
| 2010/0088404 A1* | 4/2010 | Mani .................... H04L 67/125 709/224 |
| 2011/0222404 A1 | 9/2011 | Watson et al. |
| 2012/0066586 A1 | 3/2012 | Shemesh |
| 2012/0144288 A1 | 6/2012 | Caruso et al. |
| 2013/0205020 A1 | 8/2013 | Broda et al. |
| 2013/0212465 A1 | 8/2013 | Kovatch |
| 2013/0249917 A1 | 9/2013 | Fanning et al. |
| 2016/0323186 A1* | 11/2016 | Dillon .................... H04L 47/12 |
| 2017/0255707 A1 | 9/2017 | Trestor et al. |

OTHER PUBLICATIONS

Lynn La et al. "Google Nexus 6 Review", Nov. 12, 2014, http://www.cnet.com/products/google-nexus-6-review/ accessed on Feb. 17, 2016.

Non-Final Office Action dated Nov. 9, 2017 received in corresponding U.S. Appl. No. 15/600,812, 13 pages.

* cited by examiner

| Fully Loaded Time | 9,395 sec. |
| --- | --- |
| Number of http Requests | 365 |
| Bytes Loaded | 2,732 KB |
| Number of Additional http Requests | 124 |
| Additional Bytes Loaded | 4,763 KB |

FIG. 7 ized in seconds. A typical acceptable page
METHOD AND APPARATUS FOR DETERMINING BANDWIDTH REQUIRED FOR A PAGE FEATURE

CODE APPENDIX

Attached hereto is a code appendix which is part of the disclosure herein.

BACKGROUND

It is well known to monitor the performance of computer system resources generally and web pages in particular. A typical web page is comprised of a myriad of http requests to various assets which are combined into a single document object model. For example, a web page can typically generate hundreds of http requests. Web browsers allow a finite number of concurrent http requests to run in parallel when a page is loaded. Therefore, rendering and other functions of the web page can require an undesirable amount of time. A web page that takes too long to render, or otherwise operates slowly, will likely create a poor user experience.

Figure 1:
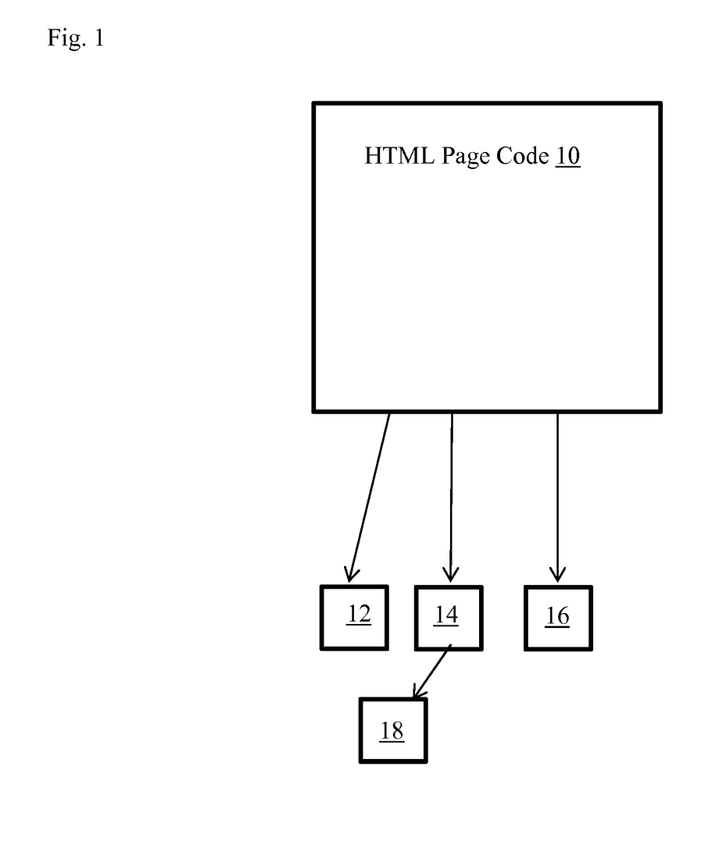
FIG. 1 is a schematic representation of a simple compound page, such as a web page written in HTML.

FIG. 1 is a schematic illustration of a very simple web page. The Web page is typically represented by HTML code. The HTML code can have various references to objects, such as graphics, frames, or the like, that are stored remotely in a distributed manner. In FIG. 1, HTML code 10 contains references to objects 12, 14, and 16 which can be stored on the same device as HTML code 10 or on another device. Further, object 14 references object 18. One or more of objects 12, 14, 16, and 18 can be more complex objects such as JavaScript Object Notation (JSON) objects. JSON is a language-independent data format used primarily to transmit data between a server and a web application. JSON objects can be complex and can require many data requests and responses.

Figure 2:
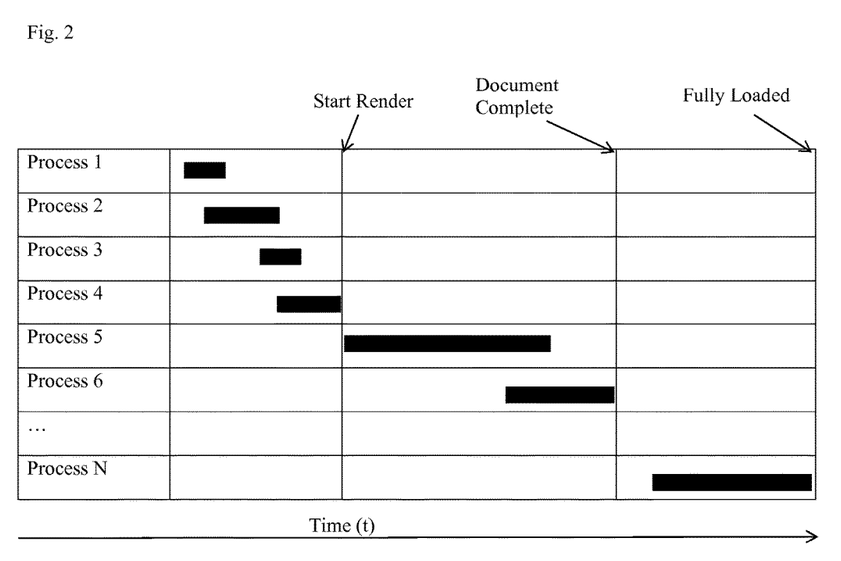
FIG. 2 is an example of a waterfall chart.

Accordingly, Web pages can be very complex and there can be thousands of requests and responses that must be accomplished in order to load the page. A "waterfall" chart, which shows the cascading order and timing of http requests as a page loads, can be used to visualize data that is generated cumulatively and sequentially during a page load. Such charts can illustrate the series of actions that occur between a client computer and a server during a page load or other activity. FIG. 2 illustrates a simple example of a waterfall chart.

Each Process, 1-N, represents a request required for the page load. N can be a very high number, such as several thousand. Each request is mapped over time. Some requests occur before rendering has started and some occur after rendering has started. It can be seen that some requests are accomplished in parallel and some in seriatim. Further, many requests can be accomplished in association with a single feature of the web page. For example, one feature might be to embed a live stock feed or a video in a web page.

Website stakeholders often set time based page load goals generally measured in seconds. A typical acceptable page load time for a web page may range anywhere from 2 seconds to 10 seconds depending on the nature and purpose of the web page being served. Page load goals are established to ensure that the user experience meets predetermined expectations. In order to meet these goals, the time it takes for the browser to consider a page "document complete" must be determined. This typically corresponds to the Java Script on load event which usually happens after all content is loaded but may not include content that is triggered by JavaScript execution. All additional JavaScript executions, after document complete, and any other possible events are then added to the document complete time to determine when a page is fully loaded.

Figure 3:
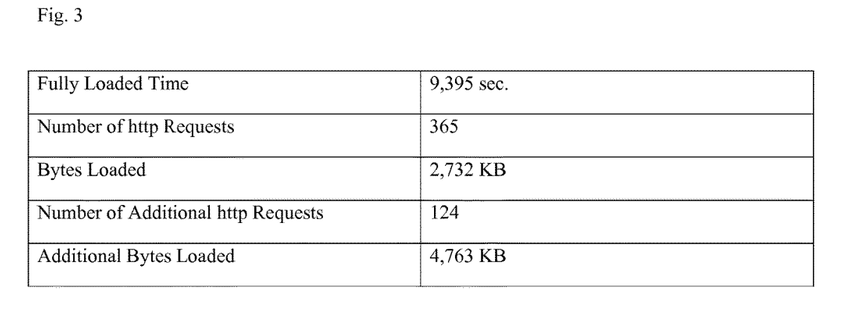
FIG. 3 is a table of web page load data.

FIG. 3 is a table of web page load data. In the example of FIG. 3, the user experienced a document complete page load time of 9.395 s. During this time, 365 http requests were made and 2,732 kilobytes of data was loaded. In order for all content to fully load, an additional 124 http requests were made totaling 489 requests with an additional 2,031 kilobytes of data downloaded totaling 4,763 kilobytes.

Many of these 489 requests are able to run in parallel (or asynchronously). However, modern browsers have limits on the number of requests that can be made per domain as well as the total number of requests that can be made. Also, the browser must schedule requests to be made. These factors mean that more requests generally results in more time to load. Even though these requests may not be directly blocking another request, they are getting scheduled when other requests could be scheduled instead, and they are contributing to the total available request slots per page. Finally, if multiple requests for a feature are going through the same domain, they can block each other based on maximum limitations per domain.

Various tools and services have been developed to monitor and measure to performance of web pages, such as measuring the time for rendering a page, checking for bad links and checking for missing files. Also, it is known to process web page performance data to provide better visibility into page performance. For example, WEBPAGETEST.ORG provides "waterfall", content, and connection timing charts for any web page.

BRIEF DESCRIPTION OF THE DRAWING

The invention will be described through embodiments in which.

DETAILED DESCRIPTION

While devices, methods, apparatuses, and computer-readable media are described herein by way of examples and embodiments, those skilled in the art recognize that devices, methods, apparatuses, and computer-readable media are not limited to the embodiments or drawings described. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include," "including," and "includes" mean including, but not limited to.

Known mechanisms for monitoring web page performance have limited applicability. For example, if a web page loads too slowly, it is difficult to determine how to modify the page to improve performance. Pragmatically, web page performance must be balanced against web page functionality. It is very difficult to determine the effect that addition or removal of a particular web page feature will have on the performance of the web page. Further, when requests run in parallel it is difficult to know the true cost of all requests associated with a particular feature on the page. The embodiments disclosed herein address this problem by, among other things, aggregating all requests associated with a particular feature whether they run synchronously or asynchronously. Loading of the page, and thus operation of the computer system, can be optimized based on the bandwidth associated with specific features of the page.

The term "feature", as used herein, refers to a specific function or related set of functions that can be effected through the page. The term "loading" or "load", as used herein, refers to the page being displayed to a user.

Figure 6:
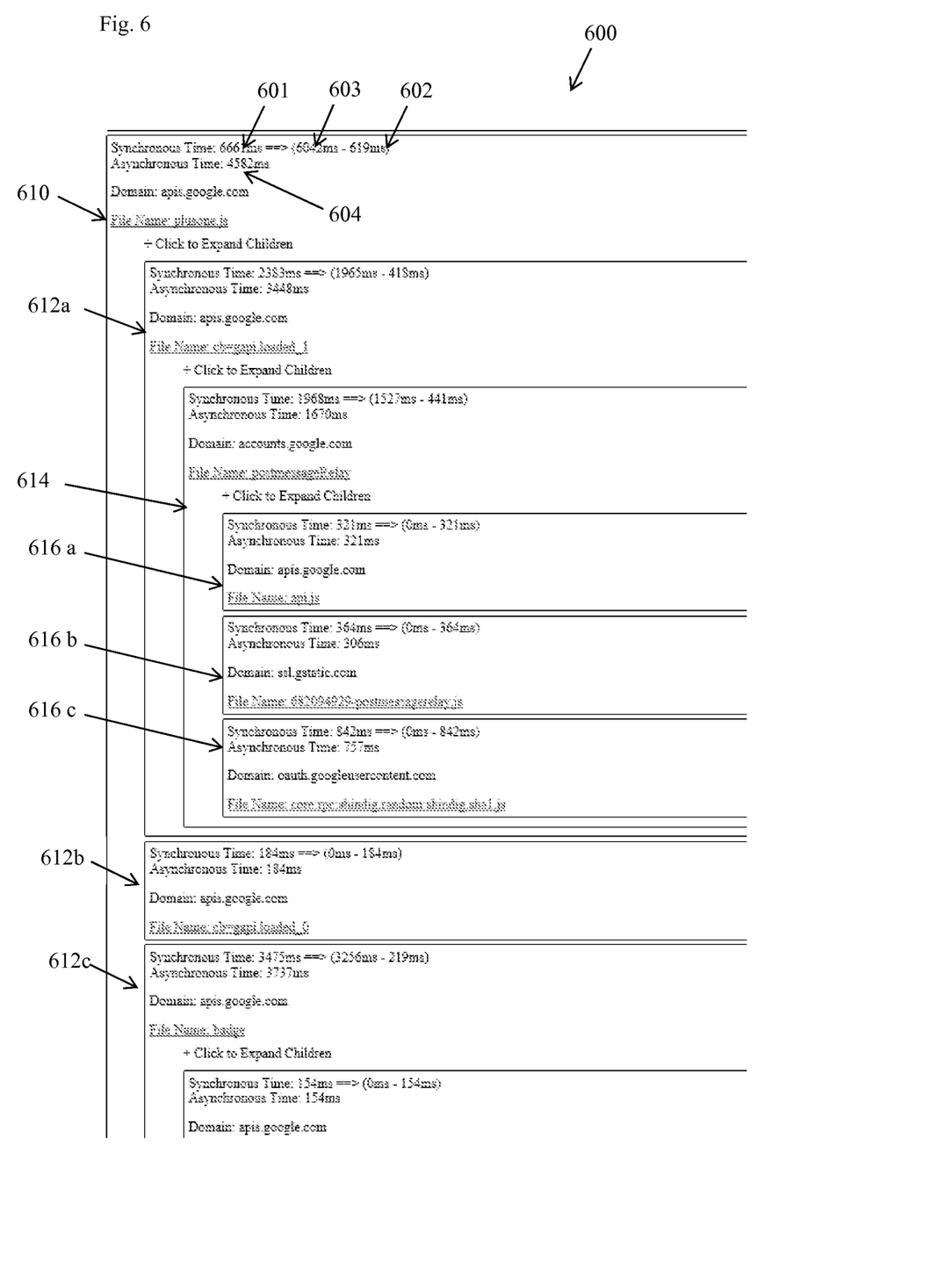
FIG. 6 is a view of a request chain data structure.

FIG. 6, discussed in greater detail below, is a grouping of requests on a page as chains, which can be used to determine that the separate requests are linked, and ultimately part of the same feature of the web page. In order to obtain the grouping, a web page is analyzed. For example, a HAR (Http ARchive) file which records all network traffic for a web page as it loads, can be analyzed. A snippet of an example HAR file is set forth below:

```
1,"cookies":[ ],"headers":[{"name":"Host","value":"cnet1.cbsistatic.com"},
{"name":"Connection","value":"keep-
alive"},{"name":"Accept","value":"text/css,*/*;q=0.1"},{"name":"User-
Agent","value":"Mozilla/5.0 (Windows NT 6.1) AppleWebKit/537.36
(KHTML, like Gecko) Chrome/40.0.2214.93 Safari/537.36
PTST/199"},{"name":"Referer","value":"http://www.cnet.com/products/g
oogle-nexus-
6/?adTargeting_campaign=blankads&ab=review_redesign:2:b"},("name":
"Accept ...
```

Figure 4:
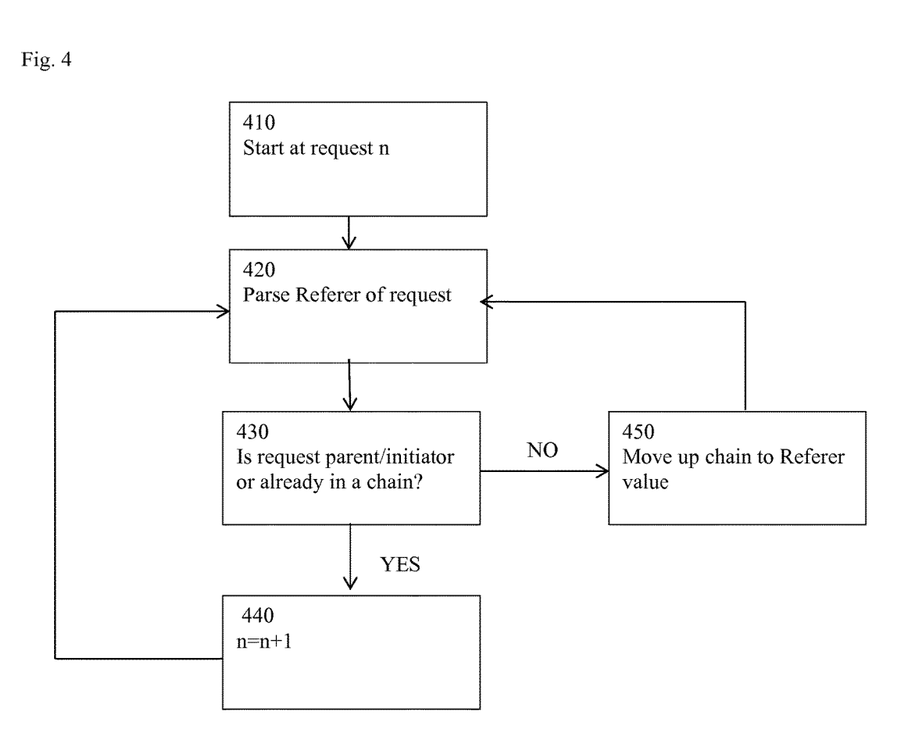
FIG. 4 is a flowchart of a method for determining request chains.

The HTTP "Referrer" element indicates which file initiated the request. In the example above, the request came from http://www.cnet.com/products/google-nexus-6/ . . . review_redesign:2:b. This information can be used to build the request chains. Code can be defined to loop through each simple request and follow the request chain upward by parsing the Referer value. FIG. 4 illustrates this process. In steps 410 and 420, request n is parsed to determine its Referer value. If there is no Referer value, the request is determined to be an initiator, i.e. parent request, in step 430. If there is a Referer value but it is a request that has previously been parsed, the chain is added to the bottom of the previously parsed chain. In either case, the process moves to step 440 where n is incremented by 1 and returns to step 420. If there is a Referer value and it is not in a request that has previously been parsed, the process moves from step 430 to step 450 in which it moves up the chain to the Referer value. In other words, chains are followed to the initiator request or to another request in the chain to place the requests in chains until all requests have been examined and placed properly in a chain.

Figure 5:
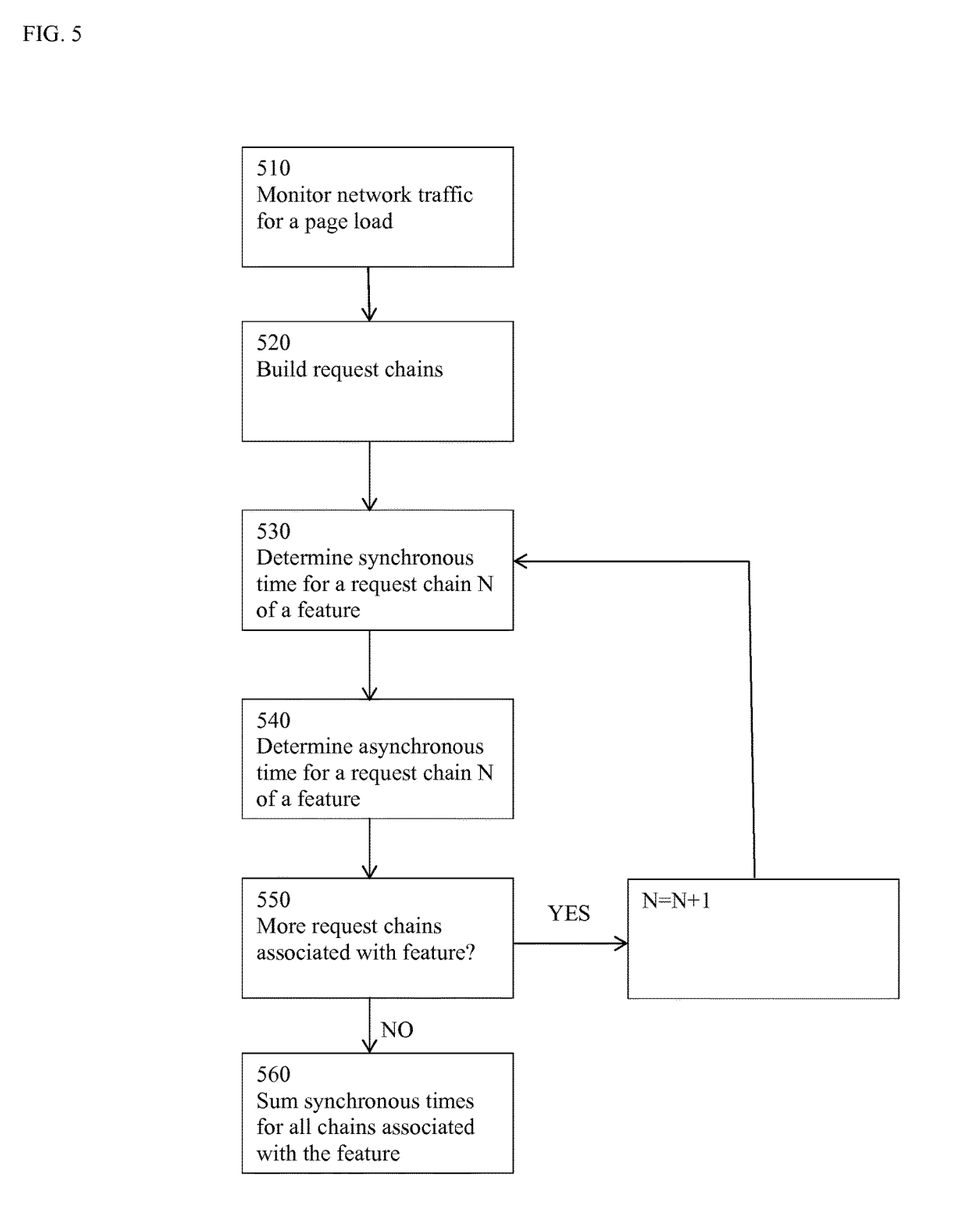
FIG. 5 is a flowchart of a method for determining time metrics for a function of a page.

FIG. 5 illustrates the overall process of determining a bandwidth metric for a feature according to an embodiment. In step 510, traffic for a page load is monitored in known manner, such as known mechanisms for creating a HAR file. In step 520, request chains are built in the manner described above with respect to FIG. 4, for example. Once the request chains are built, various metrics can be calculated for each chain. For example, Synchronous Time (step 530) and Asynchronous Time (step 540) can be calculated by monitoring the time for each request in a chain and combining them. For Synchronous Time, the individual times of the requests are summed. For Asynchronous Time, the elapsed time from the start of the chain to the end of the chain is measured. There are various known ways to measure the time of a request. The Synchronous Time metric simulates a completely serial load of all requests in the request chain, even though some of the requests may have been loaded in parallel. This is valuable, because there are a limited number of "pipes" which can be used to load parallel requests in the browser (especially mobile browsers). The Asynchronous Time is the parallel time, i.e., the difference between the end of the last request in the chain and the start of the first request in the chain.

In step 550, is determined if there are more request chains associated with a specific feature of the web page. This determination can be made by examining the domains of the requests. A database, such as a lookup table, can be constructed with known domains correlated to known functions. Ideally, there should be only one request chain associated with each feature. However, this can be circumvented by using multiple injected <script> tags or other means to start more than one request chain at the same time. The bandwidth metric for a particular feature is calculated by summing the Synchronous Times for all request chains associated with a feature in step 560.

The request chains can be stored as a data structure. FIG. 6 illustrates view 600 of a portion of a data structure for the request chains associated with the GOOGLE+™ feature of a web page. View 600 shows the requests of the chain organized in a tree structure. Element 610 is the top level request in the chain, referred to as the "parent" or "initiator" herein. It can be seen that element 610 corresponds to a request for the JavaScript™ file "plusone.js". The synchronous time for this request, including all child requests in the chain, is 6661 ms, as indicated at 601. The actual request of element 610 takes 619 ms, as indicated at 402, and the other requests in the chain take 6042 ms, as indicated at 603. The asynchronous time of request 600 has been calculated as 4582 ms, as indicated at 604.

Request 600 includes child requests 612a, 612b, 612c, and others not shown in FIG. 6. Request 612a includes child request 614 which includes child requests 616a, 616b, and 616c. It can be seen that the synchronous time and asynchronous time has been calculated for each request and the children of the request. This data can be used, along with data from any other chains associated with the function, to determine the bandwidth requirements of the function. For example, the synchronous time can be used as a bandwidth metric. The bandwidth metric can be used to determine the load times or other requirements for any specific feature of a web page or other page. Accordingly, decisions can be made regarding the tradeoff between features and user experience in a definitive manner. For example, if the request chain(s) associated with a feature take excessive bandwidth, the feature can be eliminated from the page or modified. This decision can be made with knowledge of the effects on the user experience.

Figure 7:
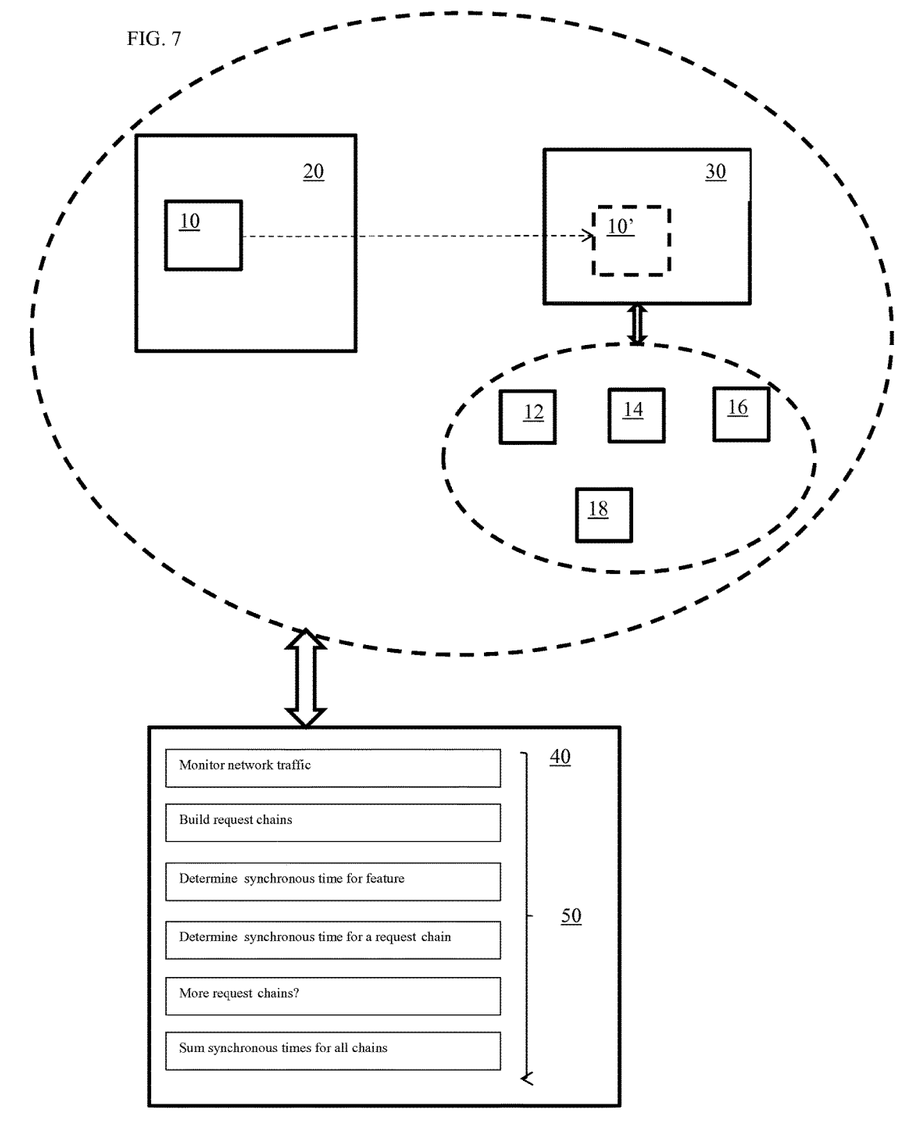
FIG. 7 is schematic of a computer system for accomplishing the disclosed embodiments.

FIG. 7 illustrates an example of a computer architecture that can be used to accomplish the methods disclosed above. The architecture includes server 20 which can be a web server and which can include one or more computing devices, client 30, which can be a web client running a browser and which can include one or more computing devices, and service computer 40 which executes the above-noted bandwidth consumption algorithms and which can include one or more computing devices.

In response to client 30 requesting page 10, through an http request for example, page 10 is served to client 30 and stored at client 30 as page 10' in a known manner. Client 30 then retrieves page elements 12, 14, 16, and 18 in a known manner, as described above with respect to FIG. 1. Service computer 40 is programmed to accomplish the methods of FIG. 5 and FIG. 6 described above through a program of computer executable instructions 50 stored on tangible media in a non-transient manner. The process accomplished by service computer 40 can be accomplished in substantially real time by monitoring the page load or entirely or partially at a later time with reference to files such as the HAR file described above.

The problem of bandwidth consumption of features is rooted in the architecture and protocols of the web and similar computer networks, as described above. The embodiments disclosed herein permit construction of code for a page which can be loaded efficiently and with desired functions.

Having described and illustrated the principles of our invention with reference to the described embodiments, it will be recognized that the described embodiment can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiment shown in software may be implemented in hardware and vice versa.

In view of the many possible embodiments to which the principles of our invention may be applied, we claim as our invention all such embodiments as may come within the scope and spirit of the following claims and equivalents thereto.

What is claimed is:

1. A computer implemented method for determining bandwidth of a web page load for a specific feature associated with the web page, the method comprising:
    parsing, by at least one computing device, an HTTP Archive (HAR) file indicating network traffic associated with requests of a loaded web page to be displayed on a device, wherein the parsing comprises:
    (a) determining if a request has a referrer value in the HAR file;
    (b) if the request does not have a referrer value in the HAR file, determining that the request is an initiating request;
    (c) if the request does have a referrer value in the HAR file;
    (d) moving to the referrer value, and:
    (e) repeating steps (a) through (d) until the request is the parent initiator;
    recording the requests found in the parsing step as a request chains associated with the web page, and associating the request chain with a specific feature of the web page;
    repeating the parsing and recording steps for each request chain associated with the specific feature;
    determining a respective time for loading of each of the at least one request chain; and
    aggregating the respective times for loading all of the request chains associated with the specific feature to determine a web page load bandwidth metric associated with the specific feature.

2. The method of claim 1, wherein said monitoring is accomplished in real time as the web page loads.

3. The method of claim 1, wherein said monitoring is accomplished at least in part by parsing a record file relating to the web page.

4. The method of claim 3, wherein the record file is a HTTP Archive File.

5. The method of claim 1, wherein the time for loading is a asynchronous time for loading.

6. The method of claim 1, wherein the time for loading is a synchronous time for loading.

7. The method of claim 1, wherein said aggregating comprises summing.

8. The method of claim 1, wherein said building includes parsing a request referrer from an archive file to determine the previous request in the chain and repeating until the chain is completed.

9. The method of claim 1, wherein said building includes storing the request chains in tree-like data structure.

10. The method of claim 1, further comprising adjusting features of the web page based on the bandwidth metric.

11. A computer system for determining bandwidth of a web page load for a specific feature associated with the web page, the system comprising:
    one or more processors;
    at least one memory operatively coupled to at least one or the one or more processors and having instructions stored thereon which, when executed by the at least one of the one or more processors, causes the at least one of the one or more processors to:
    parse an HTTP Archive (HAR) file indicating network traffic associated with requests of a loaded web page to be displayed on a device wherein the parsing comprises:
    (a) determining if a request has a referrer value in the HAR file;
    (b) if the request does not have a referrer value in the HAR file, determining that the request is an initiating request;
    (c) if the request does have a referrer value in the HAR file,
    (d) moving to the referrer value, and:
    (e) repeating steps (a) through (d) until the request is the parent initiator;
    record the requests found in the parsing step as a request chain associated with the web page, and associating the request chain with a specific feature of the web page;
    repeat the parse and record steps for each request chain associated with the specific feature determine a respective time for loading of each of the at least one request chain; and
    aggregate the respective times for loading all of the request chains associated with the specific feature to determine a web page load bandwidth metric associated with the specific feature.

12. The system of claim 11, wherein monitoring is accomplished in real time as the web page loads.

13. The system of claim 11, wherein monitoring is accomplished at least in part by parsing a record file relating to the web page.

14. The system of claim 13, wherein the record file is a HTTP Archive File.

15. The system of claim 11, wherein the time for loading is a asynchronous time for loading.

16. The system of claim 11, wherein the time for loading is a synchronous time for loading.

17. The system of claim 11, wherein the aggregating comprises summing.

18. The system of claim 11, wherein building includes parsing a request referrer from an archive file to determine the previous request in the chain and repeating until the chain is completed.

19. The system of claim 11, wherein building includes storing the request chains in tree-like data structure.

20. The system of claim 11, wherein features of the web page are adjusted based on the bandwidth metric.

* * * * *